Patented June 17, 1924.

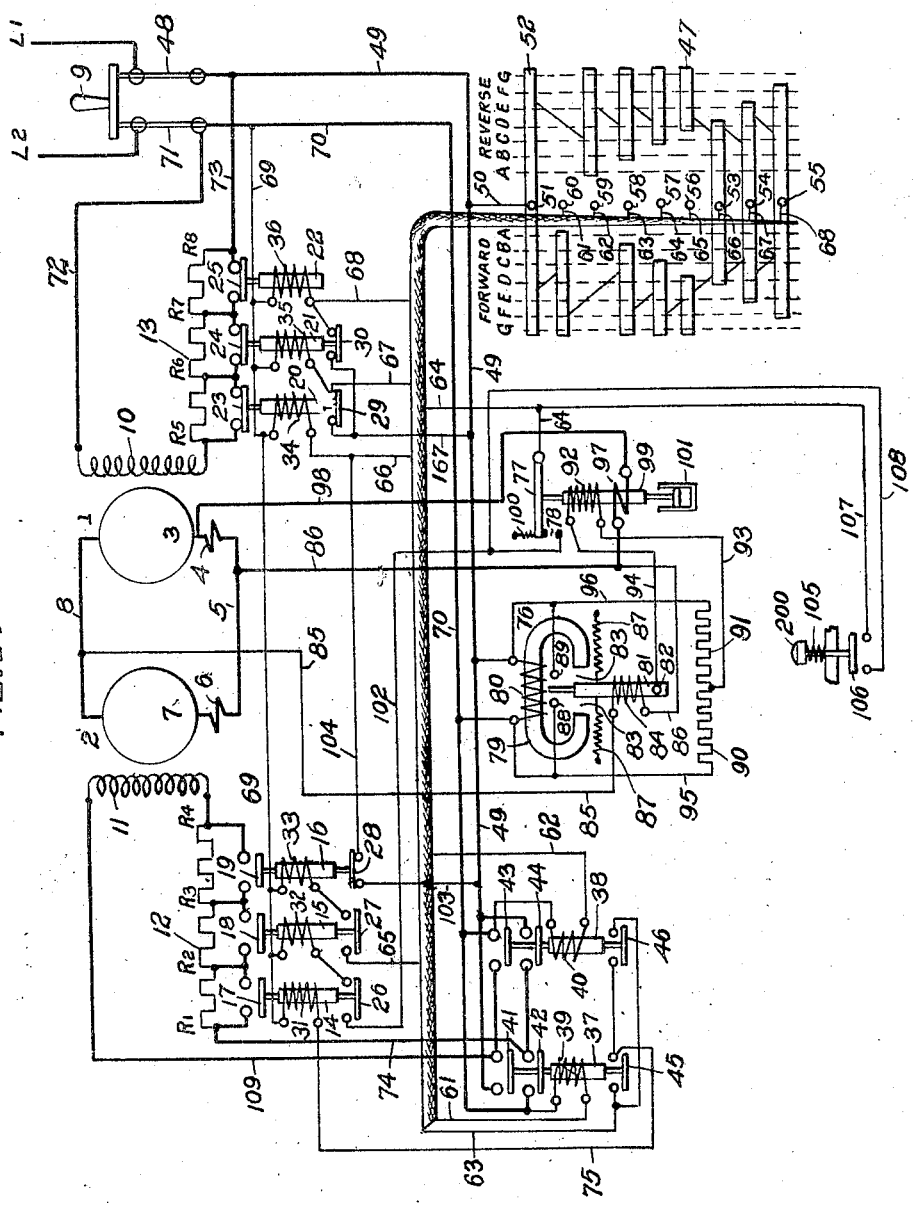

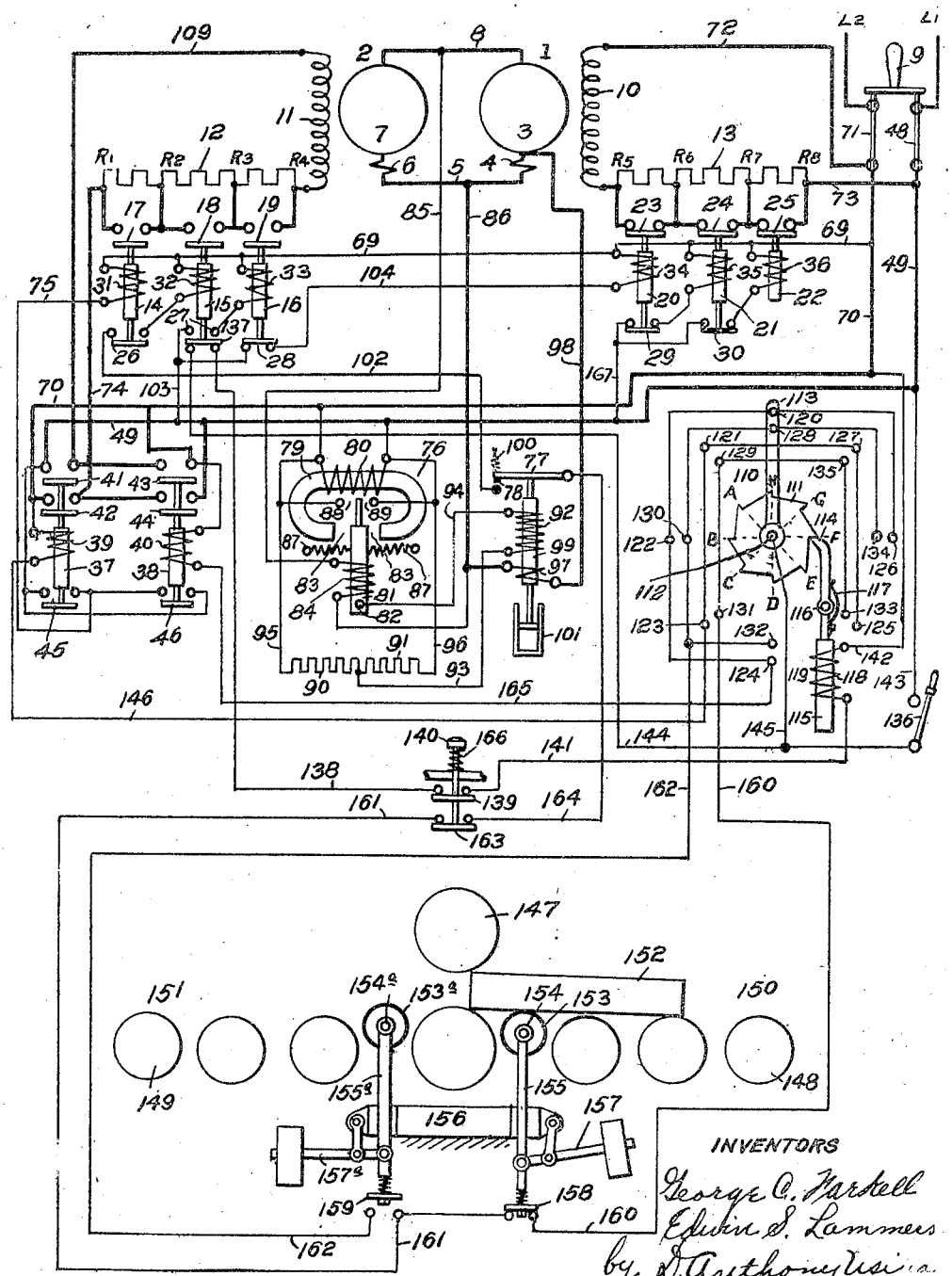

1,498,102

UNITED STATES PATENT OFFICE.

GEORGE C. FARKELL, OF LORAIN, OHIO, AND EDWIN S. LAMMERS, OF WILKINSBURG, PENNSYLVANIA.

SPEED-CONTROLLING APPARATUS.

Application filed March 21, 1921, Serial No. 454,141. Renewed July 20, 1923.

*To all whom it may concern:*

Be it known that we, GEORGE C. FARKELL and EDWIN S. LAMMERS, citizens of the United States, and residents, respectively, of Lorain, county of Lorain, and State of Ohio, and Wilkinsburg, county of Allegheny, and State of Pennsylvania, have invented certain new and useful Improvements in Speed-Controlling Apparatus, of which the following is a specification.

This invention relates to speed control mechanism for electrically driven apparatus, and has particular reference to such heavy duty apparatus as rolling mills and the like, which are subject to sudden shock when starting to operate on work.

Referring particularly to electrically driven rolling mills it frequently happens that spindles, coupling boxes and the like are broken, due to the severe shock received by said parts when metal is entered between the rolls while they are rotating at too high a speed. It is the primary object of this invention to limit the speed of the operating motor to a maximum safe speed until after the full load is on the motor, that is in the case of a rolling mill, until the work is actually between the rolls, thereby preventing the operator exceeding this predetermined safe speed until the load is on the motor and safeguarding the operating apparatus against the shocks and strains that are now common.

In the drawings, Figure 1 is a diagrammatic view of the invention with a reversing magnetic controller, controlled from a manually operated master controller.

Figure 2 is a diagrammatic view of the invention as applied to the driving motor of an automatic reversing rolling mill.

In the following detailed description of the invention, the apparatus will be described as driving a rolling mill for purpose of illustration, although it will be readily understood that any other motor driven apparatus may be controlled in a like manner.

With reference to Figure 1, motor 1 drives the mill and receives its power from a generator 2 which is driven at a constant rate of speed from any desired external source of power (not shown). The circuit is from motor armature 3 to motor interpole, and compensating winding 4, conductor 5, generator interpole and compensating winding 6, generator armature 7, conductor 8 to the opposite side of the motor armature 3.

An external source of constant, direct current power is obtained from L-1, and L-2, through a knife switch 9 for exciting the shunt field winding 10 of the motor 1, and shunt field winding 11 of the generator 2 and also for use in forming the control circuits.

The motor 1 is accelerated, decelerated and reversed by increasing, decreasing and reversing the voltage of the generator 2. A resistance 12 is in series with the field winding 11 of the generator 2, and the excitation of the field winding 11 is varied by cutting in and out the steps of the resistance 12, by means of the contactors 14, 15 and 16, through their main contacts 17, 18 and 19 respectively. By changing the direction of excitation of the field winding 11, the electromotive of the generator 2 is reversed. This is accomplished by means of contactors 37 and 38, which are controlled from the master controller 47.

When the generator 2 has reached its maximum voltage and it is desired to still further increase the speed of the motor 1, a resistance 13 is inserted in series with the field windings 10 of the motor 1, by opening contacts 23, 24 and 25 respectively, of magnetic contactors 20, 21 and 22, thereby weakening the excitation of the field windings 10 and allowing the motor to operate at a correspondingly higher speed.

The contactors 14, 15, 16, 20, 21 and 22 are all controlled from the master controller 47, which as stated above, also controls contactors 37 and 38. The control of the several contactors by the master controller is as follows:—With the master controller in the position shown in the drawings, a circuit is made from L-1 through knife switch blade 48, conductor 49, conductor 50, finger 51, drum casting 52, to fingers 53, 54 and 55 from which conductors 66, 67 and 68 lead through operating coils 34, 35 and 36, respectively, to conductor 69, conductor 70, knife switch blade 71 to L-2, the opposite side of the line thereby closing contactors 20, 21 and 22. At this point the motor field winding 10 is fully excited from L-2, through knife switch blade 71, conductor 72, field winding 10, contacts 23, 24 and 25, conductor 73, and knife switch blade 48, to L-1.

In the preceding paragraph a circuit has been traced from L-1 to drum casting 52 and therefore all other circuits will only be traced from the drum casting 52 of the master controller. It will also be noted that since conductors 49 and 70 are connected direct to the lines L-1 and L-2 through knife switch 9, that all other circuits will be only traced to the conductors 49 and 70.

Assuming that the master controller 47 is moved in the forward direction to position A, a circuit will be established from drum casting 52 to finger 60, conductor 61, coil 39 of contactor 37, to conductor 70. The contactor 37 will operate, closing contacts 42, 41 and 45. The generator field winding 11 will thus be energized from the conductor 49, through the contact 41, conductor 109, the field 11, resistance 12, conductor 74, contact 42 to the conductor 70. The generator 2 voltage will build up to a value corresponding to the increased excitation and consequently the motor 1 will be accordingly accelerated.

If the master controller 47 is again moved forward to the position B, a circuit will be established from the drum casting 52, to the finger 58, conductor 63, contact 45, conductor 75, coil 31, conductor 69 to conductor 70, thus operating contactor 14 to close contacts 17 and 26. Contact 17 shunts R-1 and R-2 of the resistance 12, thereby increasing the voltage of generator 2 accordingly. It will be noted that the contactor 14 cannot close until contactor 37 closes to complete the circuit through contact 45. Relay 76 is adapted to function at a voltage equal to that produced by the above combination.

Relay 76 comprises a magnet 79 which may be either a permanent magnet, or as shown in the drawings, an electro-magnet where the magnetic lines of force are produced by a coil 80 which is energized by being connected across the conductors 49 and 70. A soft iron core 81 is pivoted at 82 and is free to move in the air gap 83. Core 81 is held in a neutral or central position by spring 87 of equal tension. A coil 84 is wound upon the core 81, and is connected across the terminals of the armature 7 of the generator 2, by conductors 85 and 86, thereby polarizing the ends of the core 81, according to the direction of electromotive of the generator 2 so that it may be attracted in one direction or the other by magnet 79 and contact with either of the contacts 88 or 89.

Resistances 90 and 91, of equal value, are connected in series across conductors 49 and 70. When the contact 88 closes with core 81, coil 92 of a second relay 77 is paralleled with resistance 90, and when contact 89 closes with core 81, coil 92 of the relay 77 is paralleled with resistance 91, becoming equally energized in the reverse direction. These circuits will be traced later.

The relay 77 comprises the two coils 92, and 97, which act on a core 99, and when energized in the same direction, attract core 99 in such a manner as to overcome the tension of the spring 100 and close the contact 78. Coil 97 is connected across the interpole and compensating windings 4 of the motor 1 by means of conductors 86 and 98 and receives a portion of the current going to the motor, according to the resistance of the two paths.

Coils 92 and 97 are so adjusted that with the friction load on the motor and coil 92 energized in the same direction as coil 97 from the relay 76, the combined attraction on core 99 will lack only a very small amount of that necessary to overcome the tension of the spring 100 to close contact 78. Therefore when metal enters the rolls of the mill, or a sudden load is placed on the motor 1, coil 97 will become strong enough to close the contact 78.

The relay 76 should function at a voltage corresponding to the motor speed desired for starting the load on the motor. That is in a rolling mill, the relay 76 should function at a voltage corresponding to the motor speed desired for entering metal into the rolls of the mill. Should relay 76 function previous to when the load is applied to the motor, the current in the coil 97 would represent not only its portion of friction load current for the motor, but also its portion of accelerating current for the motor while the motor is still accelerating to the entering speed.

This would be sufficient to cause contact 78 of relay 77 to close and would necessitate an increase tension on the spring 100 to prevent the premature closing of contact 78, which would accordingly increase the minimum load required to function relay 77. Also in practice, it is essential that relay 76 be adjusted to operate at a voltage somewhat lower than the minimum load voltage in order to allow for fluctuations of voltage L-1 and L-2, heating of field winding 11, and coils 80 and 84, and resistance 12, also for slight variations in speed at which the generator 2 is driven. In order to eliminate or overcome the difficulties caused by the relay 76, functioning prior to load being applied to the motor, especially when it is necessary to adjust said relay to operate at a voltage lower than the minimum load voltage, a dashpot 101 is used on relay 77. The dashpot 101 can be set to allow sufficient time for the motor 1 to reach its load speed after relay 76 functions, and reduce the component of accelerating current in coil 97 to a negligible value before the contact 78 can close, thereby allowing for close adjustment of relay 77.

When the master controller 47 is in position B, forward direction, contactors 37 and 14 are closed, and the voltage of generator 2 has built up to that point chosen for the minimum load voltage, or in the case of a rolling mill to the point chosen for entering metal into the rolls of the mill, core 81 is polarized with sufficient strength by means of coil 84, so that sufficient attraction on one side and repulsion on the other is brought to bear on that end of core 81, which lies in the air gap 83, to overcome the tension of the spring 87 and close the contact 88. A circuit is thus established from conductor 49 to conductor 96, resistance 91, conductor 93, coil 92, conductor 94, core 81, contact 88, conductor 95 to conductor 70, thereby energizing coil 92 in the same direction as that portion of the motor armature current through coil 97.

If the master controller is now moved to the position C forward direction, the speed of the motor 1 is not increased because contact 78 of the relay 77 is still open. However, at this point, load is applied to the motor. That is, in case of a rolling mill, the metal will enter between the rolls, and contact 78 will close as explained above completing the circuit from drum casting 52 to finger 57, conductor 64, contact 78, conductor 102, contact 26, coil 32, conductor 69 to conductor 70, thereby causing contactor 15 to operate, closing contacts 18 and 27, thus increasing the voltage of generator 2, another increment, by cutting out another section of the resistance 12.

The master controller 47 is now moved to the position D, forward direction, and completes a circuit from drum casting 52 to finger 56, conductor 65, contact 27, coil 33, conductor 69 to conductor 70, thereby operating contactor 16 to close contact 19 and opening contact 28, thus increasing the voltage of the generator 2, another increment, or its full voltage, by cutting out the remaining section of the resistance 12.

When the master controller 47 is moved to the position E, forward direction circuit is broken between the drum casting 52 and the finger 53, opening the circuit to coil 34, which will cause contacts 23 and 29 of contactor 20 to open by gravity. Thus the excitation of field winding 10 of motor 1 is weakened by the addition of steps R-5 and R-6 of the resistance 13 in the circuit to the field windings, and the motor 1 is correspondingly increased.

The opening of contact 29 opens the holding circuit to coil 35 and allows contacts 24 and 30 of contactor 21 to open by gravity when master controller 47 is moved to position F forward direction, thereby adding another increment of resistance 13 to the circuit of the field winding 10 of the motor 1. The contact 30 opens the holding circuit to coil 36 and allows the contact 25 to open by gravity when the master controller 47 is moved to the position G, forward direction, thereby adding the last increment of the resistance 13 to the circuit of the motor field winding 10 and weakening it to the maximum amount. Therefore, since at this point all the resistance has been cut out of the circuit to the generator field winding 11, and the maximum resistance has been added to the circuit of the motor field winding 10, the motor is running at its maximum speed and will continue at such speed until the load is taken off the motor or the master controller is returned to a lower speed.

With the motor running at its maximum speed and the load on the motor being suddenly reduced to a friction load, as upon the metal leaving the rolls of a rolling mill, the current in coil 97 of relay 77 will be reduced to such a value that the combined force exerted in core 99 is no longer sufficient to overcome the tension of spring 100, and the contact 78 opens. The opening of contact 78 will open the circuit to coil 32, which causes contacts 18 and 27 to drop open by gravity, thereby opening the circuit to coil 33 and causing the contact 19 to open and contact 28 to close, thus establishing a circuit from conductor 49 to conductor 103, contact 28, conductor 104, conductor 66, coil 34, conductor 69, to conductor 70. Coil 34 is thus energized, closing contacts 23 and 29. The contact 29 closes a circuit from conductor 49 to conductor 167 to coil 35, causing contacts 24 and 30 to close, and contact 30 closes a circuit from conductor 167 to coil 36, which closes contact 25. All the above takes place after the load is taken from the motor 1, although the master controller 47 is still in its final position G, the opening of contact 78 caused by the load leaving the motor brings all conditions back to that when the master controller 47 was in position B, and the motor is reduced to the entering speed.

In decelerating the motor, the motor regenerates into the generator, causing the current in the armature circuit to reverse and thereby reversing the current in the coil 97, of relay 77. Coil 97 at this point bucks coil 92 and keeps the contact 78 open rather than closing it, as accelerating current does.

It can readily be seen from the above described features that when this control system is applied to a non-reversing rolling mill, or the like, it is unnecessary to manipulate the master controller, after first starting the motor and getting it to maximum speed, since the motor would be automatically reduced to the speed at which load is to be applied after each load leaves the motor. That is, in a rolling mill, as soon as the metal leaves the rolls the motor would automatically reduce to the entering speed for the next piece.

Although the operation has been described in detail for a step to step movement of the master controller 47, it will be understood that the controller can be moved rapidly to any desired position, and if beyond the entering speed position, the motor will not accelerate beyond the speed at which a load is to be applied until the load is put on the motor.

If the motor 1 is running at maximum speed, and the master controller 47 is in the position G, forward direction and is rapidly moved to position G, reverse direction, the following circuits are made. As the drum casting 52 passes to the off position, the contactors 22, 21 and 20 will close in the reverse order that they opened and the contactors 16, 15, 14 and 37 will open in the reverse order they had closed.

As the drum 52 passes through the position A, reverse direction, a circuit is made to the finger 59, conductor 62, coil 40 to conductor 70, thus operating contactor 38 and closing contacts 43, 44 and 46. The excitation of the field winding 11 is now reversed from conductor 49, through contact 44, conductor 74, resistance 12, field 11, conductor 109, contact 43 to conductor 70. In the position B, reverse direction, a circuit is completed to coil 31 through the contact 46 in a similar manner as through contact 26 for forward direction, closing contacts 17 and 26. However, as the master controller 47 passes into the position G, reverse direction, nothing else happens until the load is applied to the motor while it is running in the reverse direction. That is, in case of a rolling mill, nothing else happens until the metal enters the rolls again in the reverse direction.

At the very instant the master controller 47 is moved back from the position G, forward direction, and the motor begins to decelerate, the contact 78 of the relay 77 opens, as previously explained, and will remain open until a load is applied to the motor in the reverse direction. As the motor decelerates, the generator voltage is decreasing toward zero, and just as the generator passes below the voltage, which reduces the speed of the motor to the point at which the load is to be applied, contact 88 of relay 76 will open de-energizing coil 92 of relay 77. The relay 77 is necessarily of such construction that the decelerating current or accelerating current in the motor armature 3 cannot reach such a value as to cause the relay 77 to function from the coil 97 alone.

The voltage of generator 2, passes through zero and builds up in the other direction, and as the speed of motor 1 passes through zero and begins to rotate in the other direction, the current that produced a decelerating torque, will then produce an accelerating torque.

When the voltage of the generator 2 builds up to the point where it is operating the motor 1 at the speed at which a load is to be applied in the reverse direction, contact 89 closes on relay 26, since coil 84 polarizes core 81 so as to force it in that direction. The contact 89 when closed with the core 81 forms a circuit from the conductor 49 to conductor 96, contact 89, core 81, conductor 94, coil 92, conductor 93, resistance 90, conductor 95 to conductor 70. Coil 92 of the relay 77 is thus energized in a reverse direction to that it was in the forward direction, and since the current in coil 97 was reversed when the motor 1 was decelerated, coil 92 is now energized in the same direction as coil 97. As load is applied to the motor, the motor will accelerate to the maximum speed the same as in the forward direction.

In rolling mills of the reversing type, the manipulation of the metal is done only on one side of the mill and it is sometimes necessary to make a pass through the mill without taking a draft. Therefore when this invention is applied to a driving motor of a rolling mill and the metal is passed through the mill without taking a draft, relay 77 would not operate and considerable delay would be experienced in making the pass at entering speed, that is the speed at which a load is to be applied. To eliminate this difficulty a push button 200 is used and its contact 106 is normally held open by compression spring 105. Contact 106 is connected by means of conductors 107 and 108, so as to bridge contact 78 of relay 77 when the button 200 is depressed to close the contact 106.

The operator can use the button 106 when making a pass through the mill without taking a draft and accelerate the motor. Only a momentary closure of the contact 106 is needed since as the accelerating current of the motor 1 passes through the coil 97, when coil 92 is energized, the contact 78 will close and the motor will continue to accelerate the same as if a load had been applied.

In Figure 2 of the drawings, we have shown a slightly modified form of our invention adapted to the driving motor of an automatic reversing rolling mill. It is not necessary that there be speed control on the motor, for, after the piece enters the rolls, it is desirable that the motor accelerate as far as possible to its maximum speed until the metal leaves the rolls when the motor is reversed. Therefore the master controller has been replaced by a solenoid operated master switch 110. If the piece of metal being rolled is long enough, the motor will reach its maximum speed, otherwise it will not.

The armature circuits of the motor 1 and the generator 2, and the circuits to the field windings 10 and 11 are the same as in Figure 1. The operation of relays 76 and 77 are also same as has been described above for Figure 1, as are the connections to relay 76 and coils 92 and 97 of relay 77.

The master switch 110 comprises a ratchet 111 fixed to a shaft 112 to which is fastened a rotating arm 113. A pawl 114 is pinned to a core 115 at 116, where it is free to move and is kept engaged against the ratchet 111 by means of a spring 117. The ratchet 111 is divided into eight equally spaced notches and when the coil 118 is energized, the core 115 raises and moves pawl 114 to rotate the arm 113 forty-five degrees. Thus, every operation of solenoid 119 moves the arm 113 through forty-five degrees so that arm 113 engages the various contact segments 120 to 135 as it moves from position to position.

As described for Figure 1, all circuits will be traced to conductors 49 and 70 only. With knife switches 9 and 136 in the position shown in the drawings, all contactors will be in the positions shown. When the parts are in the position shown, in the drawings a circuit is made from conductor 49 to conductor 103, contact 28, conductor 104, coil 34, conductor 69 to conductor 70, and closes contacts 23 and 29 of contactor 20. Contact 29 in turn closes a circuit to coil 35, which causes contacts 24 and 30 of contactor 21 to close, and contact 30 closes a circuit to coil 36, closing contact 25 of contactor 22, thereby cutting out all the resistance 13 from the circuit to the motor field winding 10.

In order to start the motor 1, knife switch 136 is closed and completes a circuit from conductor 49 to conductor 143, knife switch 136, conductor 144, contact 137, conductor 138, contact 139 of push button 140, conductor 141, coil 118, conductor 142 to conductor 70. As the above circuit is completed solenoid 119 is energized and operates to move the arm 113 to the position A, completing a circuit from conductor 49, to conductor 143, knife switch 136, conductors 144 and 145, arm 113, contact segment 121, conductor 146, coil 39 to conductor 70. Contactor 37 is operated when coil 39 is energized, thereby closing contacts 41, 42 and 45 and closing the circuit to coil 31, operating contactor 14, closing contacts 17 and 26, and allowing the motor to start in the forward direction.

The generator 2, after the motor is started, builds up to entering speed voltage where contact 88 of relay 76 closes, energizing coil 92 of the relay 77, as described for the apparatus of Figure 1, when the motor will rotate at entering speed.

Referring particularly to the diagrammatic skeleton showing of a rolling mill comprising reducing rolls 147, and tables 150 and 151 having transfer rollers 148 and 149, respectively. An automatic contacting apparatus is mounted in the mill and comprises rollers 153 and 153$^a$, which are mounted in bearings 154 and 154$^a$, respectively, on contact arms 155 and 155$^a$. Contact arms 155 and 155$^a$ are passed through vertical guide ways in a bearing block 156, and are adapted to be normally held in a raised vertical position by counterweighted lever 157 and 157$^a$, respectively. The lower ends of contact arms 155 and 155$^a$ are adapted to close contacts 158 and 159, respectively, when they are depressed. As the metal 152 to be rolled is fed to the mill along the table 150, it will engage the roller 153, and depress contact arm 155, thereby closing contact 158. After the mill has been reversed and the metal is moving in the reverse direction along the table 151, it will engage the roller 153$^a$, and depress contact arm 155$^a$ closing contact 159. The above operation will be more fully described, as the description of the operation progresses.

When the piece of metal 152 enters between the rolls 147, the load is applied to the motor, since it takes considerable more power to operate the rolls when they are reducing the metal than when running idle, therefore, relay 77 will operate to close contact 78. The closing of contact 78 completes a circuit from conductor 49 to conductor 143, knife switch 136, conductor 144, conductor 145, arm 113, contact 129, conductor 160, contact 158, conductor 161, contact 163 of push button 140, conductor 164, contact 78, conductor 102, contact 26, coil 32, conductor 69 to conductor 70. The above described circuit will cause contactor 15 to operate, closing contacts 18 and 27 and opening contact 137. When contact 137 opens, the circuit to coil 118 is broken, allowing core 115 to drop by gravity, and pawl 114 to engage the next tooth on ratchet 111. Contact 27 completes a circuit to the coil 33, closing contact 19 and opening contact 28 of contactor 16. When contact 28 opens, it breaks the circuit to coil 34, causing contacts 23 and 29 of contactor 20 to open by gravity. When contact 29 opens it breaks the circuit to coil 35, causing contacts 24 and 30 of contactor 21 to open, and contact 30 breaks the circuit to coil 36, causing contact 25 of contactor 22 to open. When the above operations have been completed, the field 11 of generator 2 is excited to its maximum value and the field 10 of the motor 1 is weakened to its minimum value, therefore motor 1 is running at its maximum speed. Although the several contactors operate in the sequence described above, very rapidly, it takes an appreciable length of time for the current to actually change to the different values in the field windings 10 and 11, of motor 1 and generator 2, respectively, due to their inherent inductance. Therefore, due to the inherent inductance of the field windings 10 and 11, and the inertia of the motor and mill, it takes a corresponding time for the motor to accelerate to its maximum speed. Thus, unless the piece of metal 152, to be operated upon by the rolls 147 is relatively long, the motor will not reach its maximum speed before the metal leaves the rolls. When the piece of metal 152 leaves the rolls 147, and the motor 1 is accelerating, the contact 78 of the relay 77 would remain closed, and the motor continue to accelerate, unless the circuit to coil 32 is broken.

As the piece of metal leaves the roller 153, the counterweight 157 will force up the contact arm 155, and open the contact 158, thereby breaking the circuit to coil 32 of contactor 15, and cause the contactors 15 and 16 to drop open and the contactors 20, 21 and 22 to successively close. When the above circuits are made the motor will begin to decelerate and regenerate into the generator, causing a reversal of current in the circuit of armatures 3 and 7 of motor 1 and generator 2 respectively, thus reversing the current in the coil 97 of relay 77, and opening contact 78. The contact 78 will now remain open as previously described until metal 152 is entered into the rolls in the opposite direction and the motor is at the entering speed, that is, at the load applying speed.

When the circuit to coil 32 is broken by the opening of contact 158 and contactor 15 opens, contact 137 completes a circuit to coil 118 of solenoid 119 and arm 113 is moved to position B. Thus the circuit to coil 39 is broken and contactor 37 opens, also the circuit from arm 113 to contact 158 is broken and established to contact 159 in position B, so that contact 159, contact arm 155ª, counterweight lever 157ª, and roller 153ª will perform the same function as contact 158 and its associated parts when rolling metal in the opposite direction.

In position B, a circuit is established from arm 113 to contact segment 122, conductor 165, coil 40 of contactor 38, to conductor 70, contactor 38 closes, reversing the excitation of field 11 as in the system, shown in Figure 1, and described in the first part of this specification, thereby causing motor 1 to rotate in the reverse direction. The operation of the system will repeat itself for reverse operation, as described for forward direction, except that contact 89 of relay 76 will close instead of contact 88, as in forward direction.

When it is desired to reverse the mill in emergency, or when the mill starts up in the wrong direction, it is only necessary to push the button 140. As will be noted, contact 163, when opened, accomplishes the same results as when contact 78, 158 and 159 are opened, and need not be described again. However, when the mill is running at its entering speed, the opening of contact 163 would do nothing, since the contactor 15 is open and contact 137 is thereby closed. Therefore, it is necessary to break the circuit from the contact 137 to coil 118 by means of the contact 139 on the push button 140. The opening of the contact 139, will de-energize coil 118, causing core 115 to drop by gravity and allow pawl 114 to engage the next tooth on ratchet 111. When the circuit is remade at the contact 139, coil 118 is re-energized and arm 113 is moved to the next position, reversing the motor. The contacts 139 and 163 remake or complete the circuits again as soon as the push button 140 is released, due to the tension of the spring 166.

As before stated, that while this invention has been described primarily as controlling the driving motor of a rolling mill, it will be understood that it is adapted for controlling the driving motors of other mechanisms, and therefore, we do not wish to be limited to its use in connection with a rolling mill.

It will also be understood that various changes in minor details will readily suggest themselves to those skilled in the art and may be made without departing from the spirit of our invention, as defined in the appended claims.

We claim:—

1. In a controlling system for motors, a motor having an armature and a field winding, a sectional resistance in series therewith, electrically energized contactors for successively cutting said resistance sections into series with said winding, a generator electrically connected to said motor for supplying operating current to said motor armature, a field winding for said generator, a sectional resistance in series with said generator field winding, electrically energized contacts for successively cutting said resistance sections out of series with said generator field winding, a master controller adapted to be moved successively to a series of operative positions for successively energizing the contactors for the generator field resistance, for successively cutting the sections of said resistance out of series with the generator field winding to increase the generator field excitation, and thereafter successively de-energize the contactors for the motor field resistance, for successively cutting the sections of said resistance into series with the motor field winding to decrease the motor field excitation, a compensating coil in series with said motor armature, a relay switch having a winding electrically shunting said compensating coil, whereby the flow of current through said relay winding increases sufficiently as the motor load increases to close said switch, said relay switch being adapted to control certain of the operating circuits from said master controller to said contactors, and therefore preventing the operation of certain contactors until after a load above the normal friction load is applied to the motor.

2. The combination with an electrically driven rolling mill, having reducing rolls and transfer tables, of a speed controlling system for said mill, said system comprising, a motor having an armature and a field winding, and being adapted to drive said mill, a sectional resistance in series with said motor field winding, electrically energized contactors for successively cutting said resistance sections into series with said field winding, a generator electrically connected to said motor for supplying operating current to said motor armature, a field winding for said generator, a sectional resistance in series with said generator field winding, electrically energized contactors for successively cutting said resistance sections out of series with said generator field winding, a master controller adapted to be moved successively to a series of operative positions, for successively energizing the contactors for the generator field resistance, for successively cutting the sections of said resistance out of series with the generator field winding, to increase the generator field strength, and thereafter successively de-energizing the contactors for the motor field resistance to successively cut the sections of said resistance into series with the motor field winding to decrease the motor field strength, and means for preventing the operation of certain of said contactors until metal enters between said reducing rolls, thereby putting a load on said motor, said last named means comprising a compensating coil in series with said motor armature, a relay switch having a winding electrically shunting said compensating coil, whereby the flow of current through said relay winding increases sufficiently as the metal enters the rolls and increases the load upon the motor to close said switch, said relay switch controlling a majority of the operating circuits from said master controller to said contactors and therefore preventing the operation of said contactors until after the metal enters the rolls.

3. The combination with an electrically driven rolling mill, of a motor for driving said mill, said motor having an armature and a field winding, a sectional resistance in series therewith, electrically energized contactors for successively cutting said resistance sections into series with said winding, a generator electrically connected to said motor for supplying operating current to said motor armature, a field winding for said generator, a sectional resistance in series with said generator field winding, electrically energized contacts for successively cutting said resistance sections out of a series with said generator field winding, a controller adapted to energize the contactors for the generator field resistance for cutting the sections of said resistance out of series with the generator field winding to increase the generator field excitation, and thereafter de-energize the contactors for the motor field resistance, for cutting the sections of said resistance into series with the motor field winding, to decrease the motor field excitation, means preventing the operation of certain of said contactors until a load is applied to said motor by passing metal between the rolls of the mill, said last named means comprising a compensating coil in series with said motor armature, a relay switch having a winding electrically shunting said compensating coil, whereby the flow of current through said relay winding increases sufficiently as the metal enters the rolls and increases the load upon the motor to close said switch, said relay switch controlling a majority of the operating circuits from said master controller to said contactors and, therefore, preventing the operation of said contactors until after the metal enters the rolls.

4. The combination with an electrically driven rolling mill, of a motor for driving said mill, said motor having an armature and a field winding, a sectional resistance in series therewith, electrically energized contactors for successively cutting said resistance sections into series with said winding, a generator electrically connected to said motor for supplying operating current to said motor armature, a field winding for said generator, a sectional resistance in series with said generator field winding, electrically energized contacts for successively cutting said resistance sections out of a series with said generator field winding, a controller adapted to energize the contactors for the generator field resistance for cutting the sections of said resistance out of series with the generator field winding to increase the generator field excitation, and thereafter de-energize the contactors for the motor field resistance, for cutting the sections of said resistance into series with the motor field winding, to decrease the motor field excitation, and means for automatically controlling the operation of a majority of said contactors, said means being adapted to prevent the operation of said contactors until metal is entered between the rolls of said mill, thereby putting a load on said motor, substantially as described.

5. The combination with a motor and a generator in circuit therewith, of means for varying the field excitation of the generator to vary the motor speed, a load-responsive relay for rendering said means effective, and a second relay responsive to the electromotive force of said generator for controlling the first named relay.

6. The combination with a motor and a generator in circuit therewith, of means for varying the field excitation of the generator to vary the motor speed, a relay for controlling said means having a pair of operating coils, one of which is responsive to load current, and a second relay responsive to a predetermined value of the generator electromotive force for rendering the other coil effective.

7. The combination with a motor and a generator in circuit therewith, of means for varying the field excitation of the generator to vary the motor speed, a relay for controlling said means having an operating coil responsive to motor load current, a shunt-wound coil for assisting said current coil, and a second relay responsive to a predetermined value of the generator electromotive force for rendering said shunt coil effective.

8. The combination with a motor and a generator in circuit therewith, of means for varying the field excitation of the generator to vary the speed and direction of rotation of the motor, a relay for controlling said means to increase the generator field excitation when said motor is loaded to a predetermined degree, an operating coil for said relay responsive to the motor load current, a shunt coil for assisting said operating coil, and a polarized relay for reversing the polarity of said shunt coil to correspond to the direction of said load current through said operating coil.

9. The combination with a motor and a generator in circuit therewith, of means for varying the field excitation of the generator to vary the speed and direction of rotation of the motor, a relay for controlling said means to increase the generator field excitation when said motor is loaded to a predetermined degree, an operating coil for said relay responsive to the motor load current, a shunt coil for assisting said operating coil, and a polarized relay having an operating coil responsive to the electromotive force of said generator for reversing the polarity of said shunt coil to correspond to the direction of said load current through said operating coil.

10. The combination with a motor and a generator in circuit therewith, of means for varying the field excitation of the generator to vary the speed and direction of rotation of the motor, a relay for controlling said means to increase the generator field excitation when said motor is loaded to a predetermined degree, an operating coil for said relay responsive to the motor load current, a shunt coil for assisting said operating coil, and a polarized relay for maintaining the operative relation of said relay coils to correspond to either direction of operation of said motor.

11. The combination with a motor and a generator in circuit therewith, of means for varying the field excitation of the generator to vary the speed and direction of rotation of the motor, a relay for controlling said means to increase the generator field excitation when said motor is loaded to a predetermined degree, an operating coil for said relay responsive to the motor load current, a shunt coil for assisting said operating coil, a polarized relay for maintaining the operative relation of said relay coils to correspond to either direction of operation of said motor, and means for rendering said first named relay ineffective during dynamic braking upon reversal of said motor.

12. The combination with a motor and a generator in circuit therewith, of means for varying the field excitation of said generator to vary the speed and direction of rotation of said motor, a load relay for increasing the generator field excitation when said motor is loaded to a predetermined degree and means for automatically decreasing said field excitation when the load is reduced.

13. The combination with a motor and a generator in circuit therewith, of means for varying the field excitation of said generator to vary the speed and direction of rotation of said motor, electro-responsive means for increasing the generator field excitation when said motor is loaded to a predetermined degree and means for automatically decreasing said field excitation when the load is reduced.

14. The combination with a motor and a generator in circuit therewith, of means for varying the field excitation of the generator to vary the speed and direction of rotation of the motor, and a relay for controlling said means to increase the generator field excitation when said motor is loaded to a predetermined degree.

15. The combination with a motor and a source of energy therefor, of means for varying the speed and direction of rotation of the motor, and a relay for controlling said means to increase the motor speed when said motor is loaded to a predetermined degree.

16. The combination with a motor and a source of energy therefor, of means for varying the speed and direction of rotation of the motor, a relay for controlling said means having a load responsive coil and a separately excited shunt-wound coil, and means for automatically maintaining the desired relation between effects of said coils upon reversal of said motor.

17. The combination with a motor and a generator in circuit therewith, of means for varying the field excitation of the generator to vary the speed and direction of rotation of the motor, a relay for controlling said means to increase the generator field excitation when said motor is loaded to a predetermined degree, an operating coil for said relay responsive to the motor load current, a shunt coil for assisting said operating coil, and a polarized relay for automatically maintaining the desired relation between effects of said coils upon reversal of said motor.

18. In a controlling system for rolling mills, the combination with a motor for driving the rolls for rolling the metal under treatment, of electroresponsive means effective when said metal enters the rolls for increasing the speed of said motor.

19. In a controlling system for rolling mills, the combination with a motor for driving the rolls for rolling the metal under treatment, of electroresponsive means effective when said metal enters the rolls for increasing the speed of said motor and for automatically decreasing the speed of said motor when said metal leaves the rolls.

20. The combination with a translating device and a source of energy therefor, of means depending upon the value of current traversing said translating device for varying the operating conditions thereof, and independent means responsive to the electromotive force of said translating device for controlling the first named means.

In testimony whereof we have hereunto set our hands.

EDWIN S. LAMMERS.
GEORGE C. FARKELL.